Dec. 25, 1962  E. H. SCHULTZ, JR  3,069,918
PULLEY HUB
Filed Sept. 15, 1960
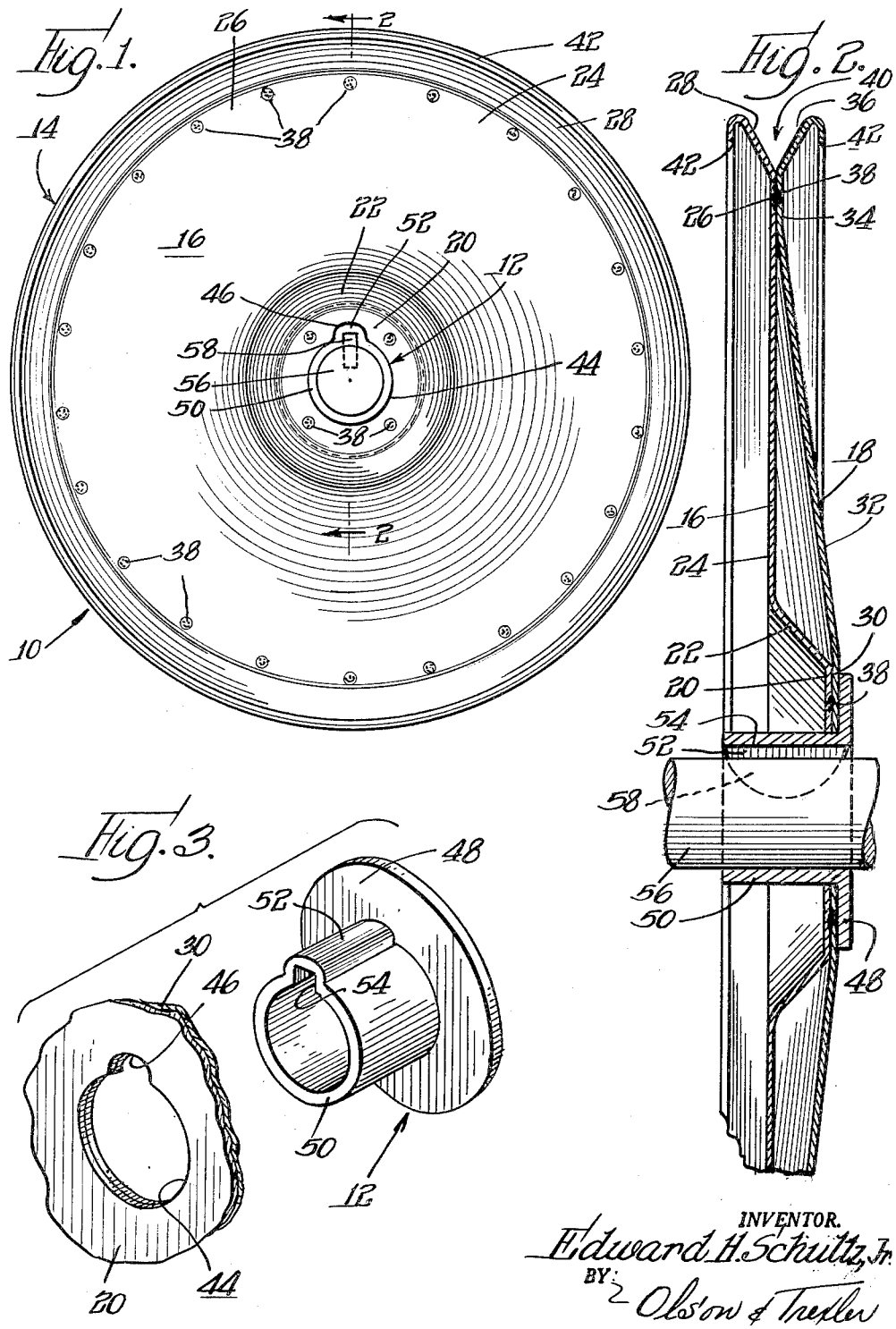
INVENTOR.
Edward H. Schultz, Jr.
BY Olson & Trexler
Attys.

United States Patent Office 3,069,918
Patented Dec. 25, 1962

3,069,918
PULLEY HUB
Edward H. Schultz, Jr., Chicago, Ill., assignor to The Nagel-Chase Manufacturing Company, Chicago, Ill., a corporation of Illinois
Filed Sept. 15, 1960, Ser. No. 56,217
5 Claims. (Cl. 74—230.4)

This invention relates generally to pulleys and more particularly to pulleys that are lightweight and inexpensive.

Pulleys of the type described are commonly provided with a groove which is milled axially on the internal diameter of the hub in order to permit a splined fitting of the pulley to its drive shaft. The reduction in hub wall thickness thus incurred creates a weakened section that is predisposed to failure, especially on repeated starting or reversing of the pulley. Rough handling too has resulted in substantial damage to hubs so constructed. If this kind of weakness in the hub is to be avoided, the major portion of the hub wall must be arranged to be considerably thicker than actually needed. Such added thickness in the wall of the hub adds both additional weight and additional cost to the pulley.

Accordingly, an important object of the present invention is to provide a pulley which overcomes the limitations of the prior art by incorporating a hub of substantially uniform wall thickness.

A more general object of the invention is to provide a new and improved pulley.

Another object of the invention is to provide a pulley which is both strong and lightweight.

Yet another object of the invention is to provide a pulley incorporating means on the hub for simultaneously keying the hub to its sheave and the pulley to its drive shaft.

Additional objects and features of the invention pertain to the particular structure and arrangements whereby the above objects are attained.

A structure in accord with the invention includes a sheave defining a central aperture and a notch opening into the aperture; and a hub including a tube portion of substantially uniform wall thickness, the tube being received into the aperture in the sheave and having an axially elongated, radially protruding projection defining externally a key adapted to enter and engage the notch in the hub fittingly whereby to mount the hub non-rotatably to the sheave, the projection also defining internally a groove adapted to cooperate with the tube in receiving a shaft in a splined fit.

The invention, both to its structure and mode of operation, will be better understood by reference to the following disclosure and drawing forming a part thereof, wherein:

FIG. 1 is a side-elevational view of a pulley constructed in accordance with the invention;

FIG. 2 is an enlarged view taken through the section 2—2 of FIG. 1; and

FIG. 3 is an enlarged, perspective view of the hub and the central portion of the sheave of the pulley illustrated in FIG. 1.

Referring now in detail to the drawing, there will be seen a pulley 10 which may be used, for example, as the drive pulley in a domestic washing machine. The pulley 10 includes a hub 12 and a sheave 14, sheave 14 being formed of two, generally circular, sheet material elements 16 and 18. The sheet material element 16 includes a hub collar portion 20, a diagonal wall portion 22, a straight wall portion 24, a rim collar portion 26 and a rim-forming portion 28 proceeding radially outwardly in succession. In somewhat similar manner, the sheet material element 18 includes a hub collar portion 30, an angulated wall portion 32, a rim collar portion 34 and a rim-forming portion 36 proceeding radially outwardly in succession. This construction of the sheet material elements 16 and 18 is well shown in FIG. 2.

The sheet material elements 16 and 18 are placed together with the rim collar portions 26 and 34 and the hub collar portions 20 and 30 abutting each other. So situated, elements 16 and 18 are then permanently joined together as by spot welds 38. When the elements 16 and 18 are thus joined together, the portions 28 and 36 form the sides of a rim or peripheral groove 40 that is intended to receive a drive element, such as a V-belt, in order to transmit motive power to or from the shaft to which the pulley 10 is affixed. Advantageously, the portions 28 and 36 terminate in turned-over lips 42 which provide a rounded edge to the sheave 14.

The sheave 14 includes a central, radially extending collar of double thickness formed by the portions 20 and 30; and in accordance with the invention, this central collar defines a central aperture 44 and a notch 46 which opens into the aperture 44. The aperture 44 and the notch 46 are adapted to receive the hub 12 in a manner which will become more apparent hereinbelow.

As is well shown in FIG. 3, the hub 12 includes an annular flange portion 48 and a tube portion 50 which is integrally joined to the flange portion 48 opening therethrough. The hub 12 may be formed with the tube 50 and the flange 48 integrally joined together by a number of common metal working operations. For example, hub 12 may be formed by forging or casting. In addition, an extruded or formed tube corresponding to the shape of tube 50 may be spun out to form the flange 48. Furthermore, an appropriately shaped sheet-metal piece may be drawn to form the tube 50 upstanding from the flange 48.

In compliance with an important feature of the invention, the tube 50 is formed with an axially elongated, radially protruding feather or projection 52; and the projection 52 is arranged to be of substantially the same wall thickness as the tube proper 50. The projection 52 is adapted to define externally a key; and when the hub 12 is assembled to the sheave 14, projection 52 is adapted to enter the notch 46 as the tube 50 enters the aperture 44. Thus, the hub 12 is non-rotatably mounted to the sheave 14. Additionally, projection 52 defines internally a groove 54 which constitutes a keyway. The sides of groove 52 are preferably parallel, and this relationship may be achieved or improved by trimming out the groove 54 in a machining operation. However, even after such trimming, the projection 52 is intended to have substantially the same wall thickness as the tube proper 50.

When the hub 12 is assembled to the sheave 14, the flange 48 will abut the hub collar portion 30; and desirably, the flange 48 is affixed to the hub collar portion 30 as by spot welds, not shown. In this assembled condition of the hub and sheave, the diagonal wall portion 22 of sheet material element 16 defines a well about the tube 50.

In use, the pulley 10 will be assembled to a shaft 56, and this connection is desirably made by means of a splined fit. Implementing such a fit is the groove 54 which is adapted to receive a key 58 that enters a cooperatively shaped slot in shaft 56 to extend radially beyond the shaft into the groove 54, as is shown in FIG. 2.

Other aspects and details of the manner in which the present invention may be practiced and the purposes to which it may be put are evident from the foregoing descriptions. It will also be apparent from these descriptions that the present invention incorporates a hub which simultaneously keys the hub to the sheave and the entire pulley to its drive shaft. Likewise, the substantially uniform wall thickness of the tube 50 and its projection 52 provides a strong and lightweight member. Accordingly, the specific example herein shown and described should be considered as illustrative only. Various changes in structure will, no doubt, occur to those skilled in the art; and these changes are to be understood as forming a part of this invention insofar as they fall within the spirit and scope of the appended claims.

The invention is claimed as follows:

1. A pulley comprising: sheave means defining a peripheral rim and a central, radially extending collar, said collar defining a central aperture and a notch opening into said aperture; and a hub member including a flange portion and a tube portion joined at one end to said flange portion, said tube portion being received in said aperture and said flange portion abuttingly engaging said collar, said tube portion having an axially elongated, radially protruding projection, said projection defining externally a key adapted to enter and engage said notch fittingly whereby drivingly to couple said hub to said sheave means, said projection defining internally a groove, said groove being adapted to cooperate with said tube portion in receiving a shaft in a splined fit.

2. A pulley comprising: sheave means including two generally circular elements joined together to define a peripheral rim and a central, radially extending collar, said collar defining a central aperture and a notch opening into said aperture; and a hub member including a flange portion and a tube portion of substantially uniform wall thickness joined at one end to said flange portion, said tube portion being received in said aperture and said flange portion abuttingly engaging said collar, said tube portion having an axially elongated, radially protruding projection, said projection defining externally a key adapted to enter and engage said notch fittingly whereby drivingly to couple said hub to said sheave means, said projection defining internally a groove, said groove being adapted to cooperate with said tube portion in receiving a shaft in a splined fit.

3. A pulley comprising: sheave means including two generally circular elements permanently joined together to define a peripheral rim and a central, radially extending collar, said collar defining a central aperture and a notch opening into said aperture; and a hub member including an annular flange portion and a tube portion of substantially uniform wall thickness integrally joined at one end to said flange portion and opening therethrough, said tube portion being received in said aperture and said flange portion abuttingly engaging said collar to be fixed thereto, said tube portion having an axially elongated radially, protruding projection, said projection defining externally a key adapted to enter and engage said notch fittingly whereby drivingly to couple said hub to said sheave means, said projection defining internally a groove, said groove being adapted to cooperate with said tube portion in receiving a shaft in a splined fit.

4. A pulley comprising: sheave means including two generally circular, sheet material elements joined together to define a peripheral rim and a central, radially extending collar formed of two thicknesses of said sheet material, said collar defining a central aperture and a notch opening into said aperture; and a hub member including a flange portion and a tube portion of substantially uniform wall thickness joined at one end to said flange portion, said tube portion being received in said aperture and said flange portion abuttingly engaging said collar, said tube portion having an axially elongated, radially protruding projection, said projection defining externally a key adapted to enter and engage said notch fittingly whereby to mount said hub non-rotatably to said sheave means, said projection defining internally a groove, said groove being adapted to cooperate with said tube portion in receiving a shaft in a splined fit.

5. A relatively lightweight pulley comprising: sheave means including a pair of generally circular sheet material members defining a peripheral rim having the innermost edge portions thereof each defining a central aperture with a radial notch opening into said aperture; and a hub member including an outwardly extending flange abutting one of said innermost edge portions and a relatively lightweight and thin-walled tube portion received in said aperture and having an axially elongated projection protruding radially beyond the outer surface of the tube portion with the exterior surface of said projection defining an external key adapted to enter and snugly engage said notches to drivingly couple said hub to said sheave means, the internal surface of said projection defining a groove radially aligned with said key and with the floor of said groove extending radially beyond the outside diameter of said tube portion to cooperate with the tube portion in receiving a shaft in a splined fit therewith, the edges of the notches engaging and supporting the side walls of said projection for reinforcing the same at the area of engagement between the sheave means and the hub.

References Cited in the file of this patent

UNITED STATES PATENTS

| | | |
|---|---|---|
| 757,088 | Brinley | Apr. 12, 1904 |
| 1,812,227 | Walker | June 30, 1931 |